(12) United States Patent
Tsuchida et al.

(10) Patent No.: US 6,315,466 B1
(45) Date of Patent: Nov. 13, 2001

(54) CLUTCH UNIT AND CAMERA

(75) Inventors: Naohiro Tsuchida, Hachioji; Yukihiko Sugita, Kokubunji; Shinya Takahashi, Hino; Hiroshi Terada, Mitaka; Yoshiyuki Kitahara, Tokyo, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/338,736

(22) Filed: Jun. 23, 1999

(30) Foreign Application Priority Data

Jun. 25, 1998 (JP) .................................................. 10-179105
Jul. 1, 1998 (JP) .................................................. 10-186492

(51) Int. Cl.$^7$ .................................................. G03B 1/00
(52) U.S. Cl. ...................... 396/411; 396/418; 192/89.27; 192/203
(58) Field of Search .................................. 192/31, 89.27, 192/203; 396/411–418

(56) References Cited

U.S. PATENT DOCUMENTS 4,372,432 * 2/1983 Waine et al. .......................... 192/31
5,136,314   8/1992 Kazima et al. .................... 354/173.1

* cited by examiner

Primary Examiner—David M. Gray
(74) Attorney, Agent, or Firm—Ostrolenk, Faber, Gerb & Soffen, LLP

(57) ABSTRACT

A clutch unit according to the present invention includes a driving sleeve fixed to a driving shaft and a driven sleeve fixed to a driven shaft. A coil-like clutch spring is received on the driven sleeve, and a clutch sleeve is received on the driving sleeve. When the driving shaft is rotated normally or reversely, the driving sleeve abuts one of the arm portions of the clutch spring. Consequently, the clutch spring engages the driven sleeve. Torque producing rotation in either direction is transmitted to the driven shaft. The clutch unit also can operate as an overrunning clutch. When the clutch unit is adapted to a film feeding and driving system in a camera, the clutch unit can be positioned to utilize what had been dead spaces in a camera body, thus promoting compact camera design.

29 Claims, 9 Drawing Sheets

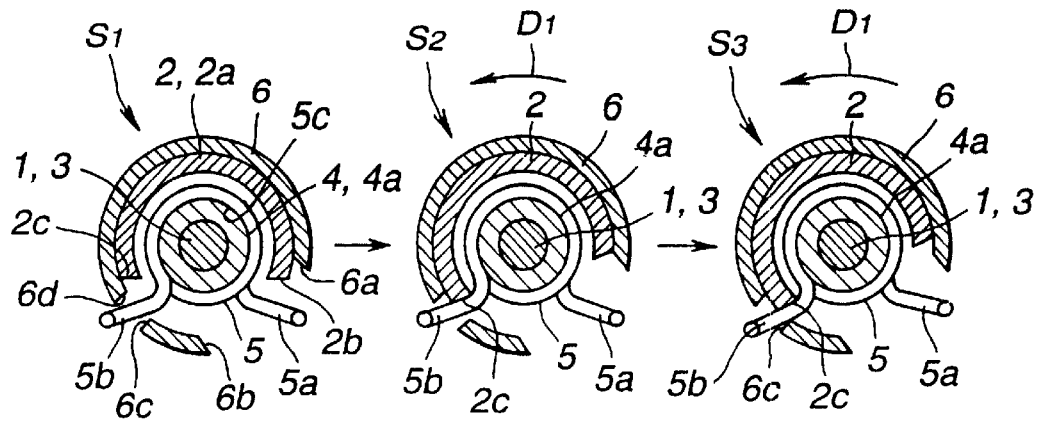
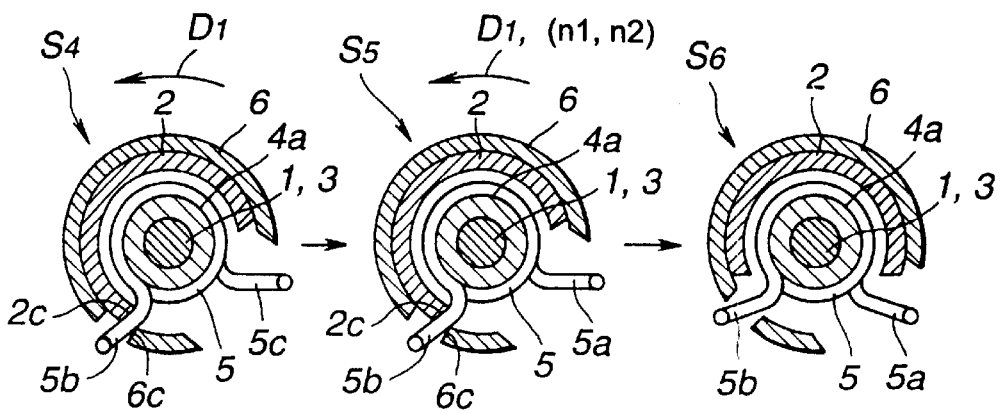
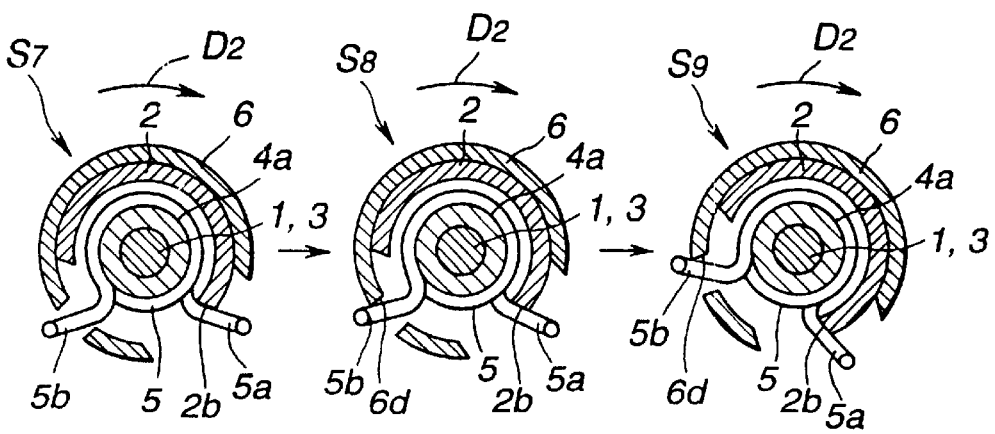
FIG. 5A  FIG. 5B  FIG. 5C
FIG. 5D  FIG. 5E  FIG. 5F
FIG. 5G  FIG. 5H  FIG. 5I

CLUTCH UNIT AND CAMERA

BACKGROUND OF THE INVENTION

1. Field of the Invention

The present invention relates to a clutch unit for selectively transmitting driving force to a camera film feeder.

2. Description of the Related Art

Conventional clutch units for selectively transmitting driving force are unidirectional. Torque exerted to rotate a driving shaft in one direction is transmitted to a driven shaft, however no torque is exerted to produce rotation in an opposite direction.

A one-way clutch unit adapted for film feeding in a camera is disclosed in U.S. Pat. No. 5,136,314 and shown in FIG. 12.

In the film feeding mechanism, driving force from a drive motor 103 is transmitted to a sun gear 106 of an epicyclic gear mechanism via a pinion 104 and gear train 105. An epicyclic gear 107 meshes with a driven gear 108 or a driven gear 109.

The driven gear 108 is coupled to a gear 102a of a spool shaft 102 via a spool gear train 111. The driven gear 108 meshes with an input gear 110a of a one-way clutch 110. An output gear 110b of the one-way clutch 110 is coupled with a cartridge driving gear 113 via a cartridge gear train 112. The cartridge driving gear 113 has a fork portion 113a received in a cartridge shaft 114. As discussed throughout, direction D13 shall be a direction of normal rotation in which the one-way clutch 110 rotates normally to drive.

When the film feeding mechanism is used to feed a film 120, the driven gear 108 is rotated in a direction D11 via the epicyclic gear mechanism. The cartridge driving gear 113 is rotated via the one-way clutch 110 and gear train 112. Consequently, the film 120 is advanced. At the same time, the spool shaft 102 is driven via the spool gear train 111. After the film 120 is advanced, when the film is wound by rotating the spool shaft 102, the film is maintained in tension. An advancing rate at which a film is advanced from the spool shaft is greater than an advancing rate at which the film is advanced from the cartridge. Therefore, the cartridge driving gear 113 is rotated quickly. The output gear 110b of the one-way clutch 110 is driven in the direction D13 relatively faster than the input gear 110a. This state shall be referred to as an overrunning state. For photography, film is wound in this manner, that is, with the spool shaft driven faster.

To rewind film, the motor 103 is rotated reversely in order to cause the epicyclic gear 107 to mesh with the gear 109. The driven gear 109 is rotated in a direction D12 via the epicyclic gear mechanism. The output gear 110b of the one-way clutch 110 is driven to rotate in a direction opposite to direction D13. The cartridge driving gear 113 is driven in an opposite direction via the gear train 112. The film 120 is rewound about the cartridge shaft. The spool shaft 102 is rotated in a direction opposite to a direction of arrow F in FIG. 12 of the film 120.

The film feeding mechanism for a camera disclosed in the U.S. Pat. No. 5,136,314 employs the one-way clutch 110 for driving the spool shaft and cartridge shaft with the spool shaft interlocked with the cartridge shaft. However, the input driving gear of the one-way clutch 110 cannot drive for rotation in both directions. For rewinding the film 120, the output gear 110b must be driven directly as shown in FIG. 12. For a driving system capable of driving in both the directions, another driving system for directly driving the output gear 110b must be added. Moreover, since the one-way clutch 110 must be interposed between the cartridge driving system and spool driving system, it requires significant sufficient space for the components and leads to a complex mechanism.

Moreover, a film feeding and driving system including the one-way clutch 110 must be positioned as a unit on the bottom or top of a camera body, resulting in ineffective use of a large space for the film feeding and driving system in the camera body.

SUMMARY OF THE INVENTION

The present invention attempts to resolve the above drawbacks. An object of the present invention is to provide a clutch unit capable of transmitting driving shaft rotational force to a driven shaft. The clutch unit provides great freedom for positioning the clutch unit.

Another object of the present invention is to provide a camera in which a clutch unit for switching drives is located at an appropriate position in a film feeding and driving system in the camera. The camera can therefore be downsized or designed compactly.

A clutch unit in accordance with one aspect of the present invention has a driving shaft, a driven shaft, and a coil spring. The driving shaft can be driven to rotate in both directions. The driven shaft is located coaxially with the driving shaft. The coil spring is used to transmit rotation of the driving shaft. The coil spring has an arm portion capable of engaging with the driving shaft and a coil portion that frictionally engages with the driven shaft. The coil spring transmits force to the driven shaft regardless of the direction in which the driving shaft is rotated. Driving force rotating the driving shaft in both directions can be transmitted to the driven shaft.

According to the clutch unit of the invention, driving shaft rotation in either direction can be transmitted to the driven shaft. The present clutch unit for a driving system expands designer freedom to position the clutch unit in a camera.

A camera according to another aspect of the present invention comprises a film cartridge chamber, a film wind chamber, a photographic lens barrel, and a clutch unit. A film cartridge having a cartridge shaft about which a film is wound is loaded in the film cartridge chamber. The film wind chamber has a film wind shaft about which film advanced from the film cartridge is wound. The photographic lens barrel is interposed between the film cartridge chamber and film wind chamber. The photographic lens barrel has an optical axis in a direction substantially perpendicular to an exposure screen mask. The clutch unit defines a transmitted state and a non-transmitted state for selectively transmitting power to a cartridge shaft, respectively. In the transmitted state, driving force exerted from a drive source is transmitted to the cartridge shaft in the film cartridge so that a film is advanced from the film cartridge. In the non-transmitted state, driving force exerted from the drive source is not transmitted to the cartridge shaft. The non-transmitted state is established when the film is wound about the film wind shaft and fed after film advanced from the film cartridge reaches the film wind shaft in the film wind chamber. The clutch unit is located in a space created between the film cartridge chamber and the photographic lens barrel or between the film wind chamber and the photographic lens barrel.

According to the camera of the present invention, the clutch unit for selectively transmitting power can be located at an appropriate position in a film feeding and driving system in the camera. The camera can therefore be downsized or designed compactly.

BRIEF DESCRIPTION OF THE DRAWINGS

FIG. 4A shows the clutch unit exhibiting normal rotation;

FIG. 4B shows the clutch unit operating as an overrunning clutch;

FIG. 4C shows the clutch unit exhibiting reverse rotation;

FIGS. 5A–5I are cross sectional views of the clutch unit of the first embodiment in progressive operational phases;

DESCRIPTION OF THE PREFERRED EMBODIMENTS

Embodiments of the present invention will be described in conjunction with the drawings.

Figure 1:
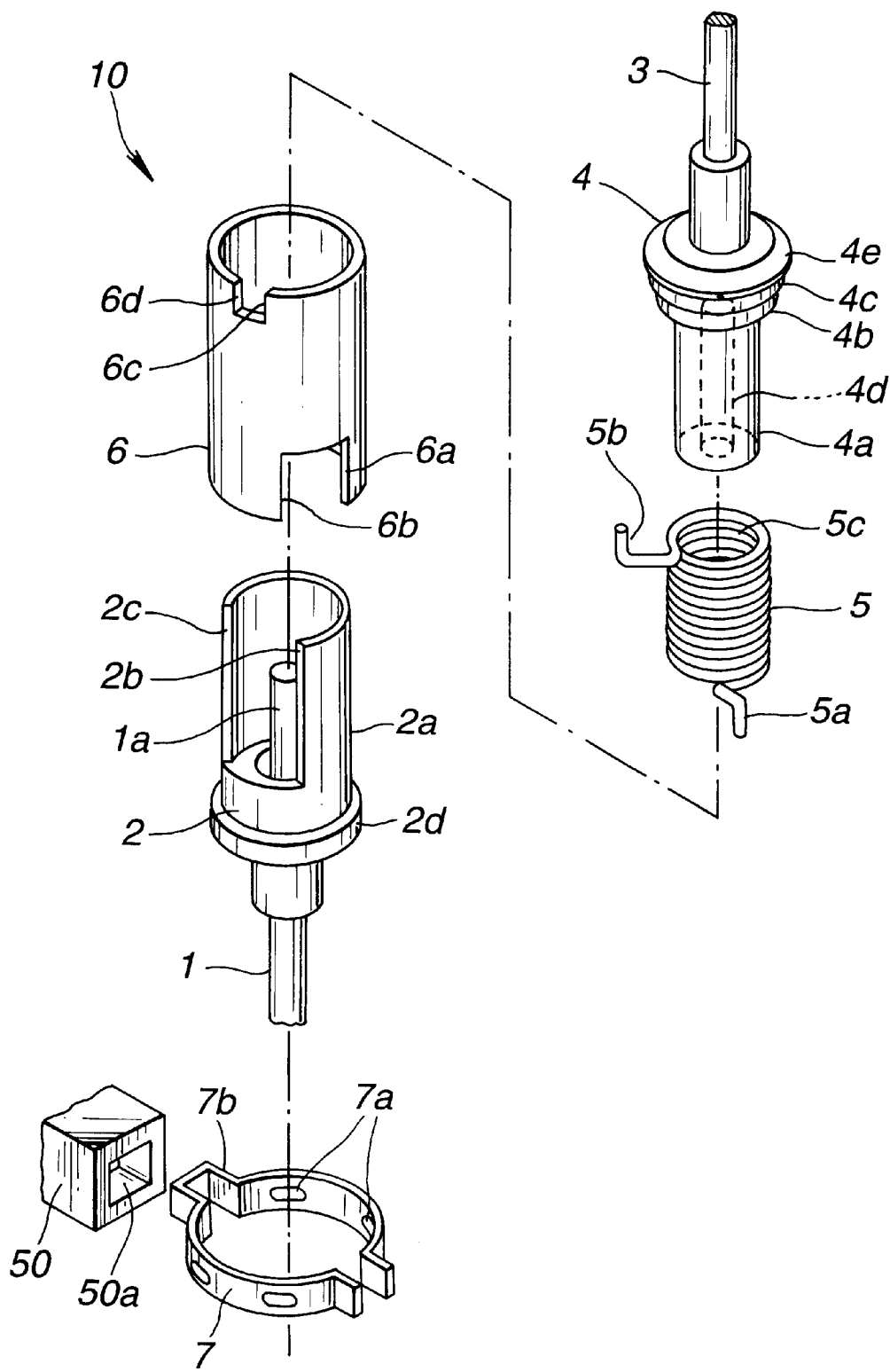
FIG. 1 is an exploded oblique view of a clutch unit in accordance with the first embodiment of the present invention.
Figure 2:
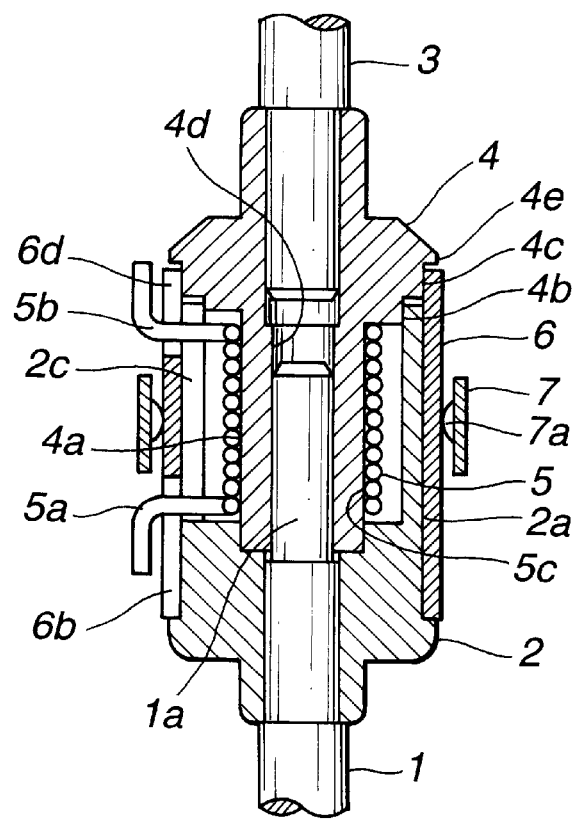
FIG. 2 is a longitudinal sectional view of the clutch unit in accordance with the first embodiment.
Figure 3:
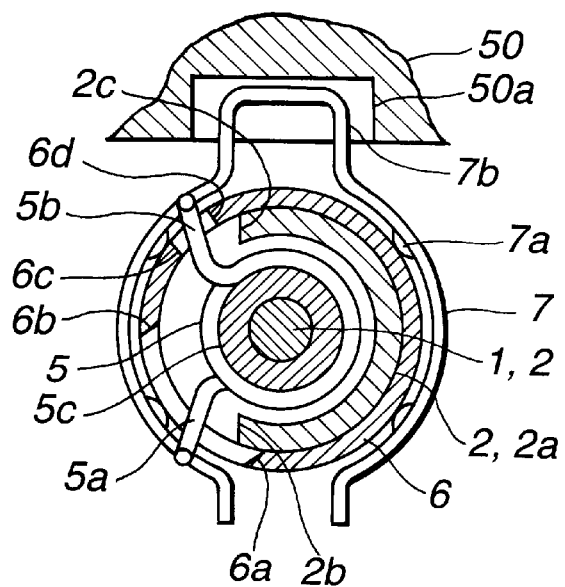
FIG. 3 is an orthogonal cross sectional view of the clutch unit in accordance with the first embodiment.

FIG. 1 is an exploded oblique view of a clutch unit 10 in accordance with the first embodiment of the present invention. FIG. 2 is a longitudinal sectional view and FIG. 3 is an orthogonal cross sectional view of the clutch unit 10.

The clutch unit 10 of this embodiment comprises a driving shaft 1, a driven shaft 3, a clutch spring 5, a clutch sleeve 6, a friction band 7, and a band holding recess 50a. The driving shaft 1 has a driving sleeve 2 fixed thereto. The driven shaft 3 is located coaxially with the driving shaft 1. A driven sleeve 4 is fixed to the driven shaft 3. The clutch spring 5 is a coil spring. The clutch sleeve 6 slidingly engages with the driving sleeve 2. The friction band 7 serves as a friction application member. The band holding recess 50a is bored in a camera body 50.

The driving sleeve 2 has a sleeve portion 2a accommodating the clutch spring 5, a notch, and a flange portion 2d. The notch is defined by notch edges 2b and 2c. The distal part 1a of the driving shaft 1 extends into the center of the sleeve portion 2a.

The driven sleeve 4 has a spring-fitted portion 4a, a shaft-fitted portion 4d, a driving shaft-fitted portion 4b, a clutch sleeve-fitted portion 4c, and a flange portion 4e. The inner circumferential surface of a coil portion 5c of the clutch spring 5 mounts on the spring-fitted portion 4a. The distal part 1a of the driving shaft 1 is received in the shaft-fitted portion 4d.

The clutch sleeve 6 has a notch defined by notch edges 6a and 6b oriented relative to the driving shaft, and a notch defined notch edges 6c and 6d oriented relative to the driven shaft. The clutch sleeve 6 rotatingly mounts on the outer circumference of the sleeve portion 2a of the driving sleeve 2. The axial movement of the clutch sleeve 6 is restricted by the flange portion 2d of the driving sleeve and the flange portion 4e of the driven sleeve.

The clutch spring 5 mounts on the spring-fitted portion 4a of the driven sleeve 4 with the inner-diameter surface of the coil portion 5c fastened to the spring-fitted portion 4a to a predetermined extent. Arm portions 5a and 5b extending from the ends of the coil portion of the clutch spring pass through the notch defined by the notch edges 2b and 2c of the driving sleeve. The arm portion portions 5a and 5b pass through the notch defined by the notch edges 6a and 6b, and the notch defined by the notch edges 6c and 6d, respectively. The coil portion of the clutch spring 5 is wound clockwise.

The friction band 7 is press-fit on the outer circumference of the clutch sleeve 6. The friction band 7 has a mid-projection 7b that is inserted into the recess 50a in the camera body. Part of the friction band 7 opposed to the mid-projection remains open. The friction band 7 is capable of being elastically deformed in radial directions. Four protuberances 7a are formed on the inner circumference of the friction band 7. The four protuberances 7a abut on the outer circumference of the clutch sleeve 6 and transmit appropriate frictional resistance to the clutch sleeve 6. While driving force is imparted, when the arm portion 5a or 5b of the clutch spring abuts the clutch sleeve 6, the friction band 7 transmits appropriate resisting force.

Figure 4A:
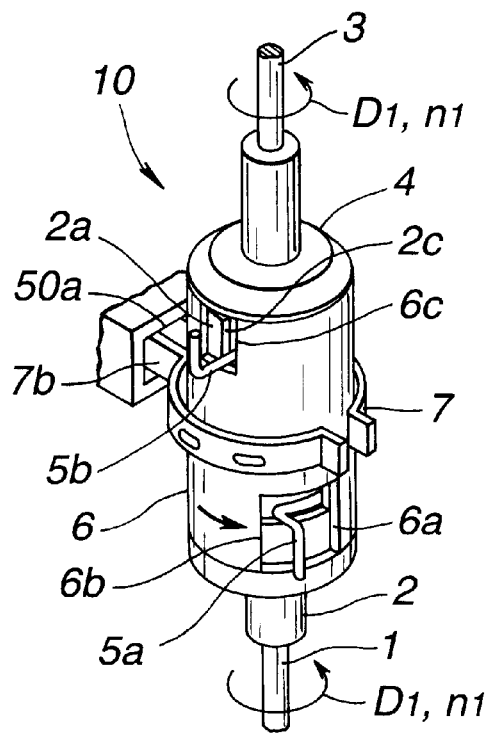
FIG. 4A to FIG. 4C are oblique views of the clutch unit of the first embodiment in three driven states.
Figure 4B:
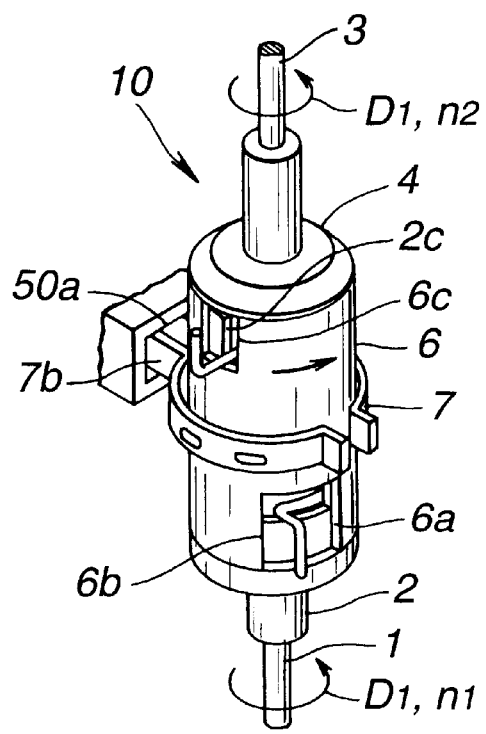
Figure 4C:
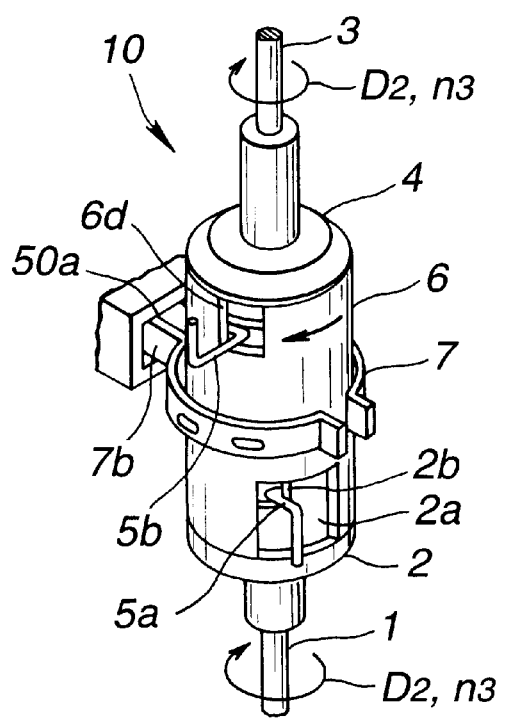

FIGS. 4A–4C are oblique views of the clutch unit 10 of this embodiment having the foregoing components in three driven states. As discussed herein, direction D1 represents the driving shaft rotating clockwise (counterclockwise from the perspective of the driven shaft) a direction of normal rotation. A direction D2 represents a direction of reverse rotation.

In FIG. 4A, the driving shaft 1 is driven in the direction D1, which is the direction of normal rotation, at a rotating speed nl. The driven shaft 3 is rotated in the same direction at the same speed. Under these conditions, the arm portion 5b of the clutch spring 5 is driven by the edge of the notch of the driving sleeve 2. The clutch spring 5 wound about the spring-fitted portion 4a is tightened. Consequently, torque rotating the driving shaft 1 in the direction D1 is transmitted to the driven shaft 3. This driven state is described below with reference to states S3 and S4 in FIGS. 5C and 5D.

FIG. 4B shows the clutch unit operating as an overrunning clutch. In this driven state, the driving shaft 1 is rotated in the direction D1 at a rotating speed nl. The driven shaft 3 is driven in the same direction D1 at a rotating speed n2, which is higher than the rotating speed nl, by another driving system. Under these conditions, the driven sleeve 4 is rotated in the direction D1 relative to the driving sleeve 2. The clutch sleeve 6 works to loosen the clutch spring 5 from the spring-fitted portion 4a. This causes the driven shaft 3 to rotate relatively in the direction D1. This driven state is described below with reference to a state S5 in FIG. 5E.

FIG. 4C shows the driving shaft 1 rotating in the reverse direction D2 at a rotating speed n3. Accordingly, the driven shaft 3 rotates in the same direction at the same rotating speed. In this state, the arm portion 5a or one of the arm portions of the clutch spring 5 is driven by the notch edge 2b of the driving sleeve 2. At the same time, the other arm portion 5b of the clutch spring 5 is driven by the notch edge 6d of the clutch sleeve 6. The clutch spring 5 therefore firmly engages the spring-fitted portion 4a. Driving force is transmitted in the direction D2. This driven state is described below with reference to states S8 and S9 in FIGS. 5H and 5I.

The clutch unit 10 of this embodiment, similar to the conventional one-way clutch unit, assumes a driven state as shown in FIG. 4A in which the driving shaft 1 is driven in the direction D1, the direction of normal rotation. When the clutch unit 10 assumes the overrunning state shown in FIG. 4B, the driven shaft 3 is rotated in the direction D1 relative to the driving shaft 1. As shown in FIG. 4C, the driven shaft 3 can be driven to rotate in the direction D2 opposite to the direction D1 by the driving shaft 1.

The clutch unit operations for selectively transmitting power will be described in conjunction with the orthogonal cross sectional views of the clutch unit in FIGS. 5A–5I. The orthogonal cross sectional views of FIGS. 5A–5I each show the cross section of the clutch unit from the perspective of the driven shaft.

The state S1 of FIG. 5A represents a free state in which the clutch unit is not driven. The driving shaft 1 is driven to rotate in the direction D1 (of normal rotation) or counterclockwise. In a state S2 of FIG. 5B, the notch edge 2c of the driving sleeve 2 abuts the arm portion 5b of the clutch spring 5 and causes the arm portion b to move in the direction D1.

In a state S3 of FIG. 5C, the arm portion 5b of the clutch spring is sandwiched between the notch edge 6c of the clutch sleeve 6 and the notch edge 2c of the driving sleeve 2. The arm portion 5a of the clutch spring remains free. In this state, the clutch spring 5 engages the spring-fitted portion 4a due to abutment force of the driving sleeve 2 against the notch edge 2c.

In a state S4 of FIG. 5D, the driving shaft 1 rotates in the direction D1 with the clutch sleeve 6. This rotation is transmitted to the driven sleeve 4 via the clutch spring 5. The driven shaft 3 thereby is driven to rotate with the driving shaft 1. The friction band 7 is not shown in FIGS. 5A–5I for ready comprehension of the mechanisms of the present clutch, but is present to engage the clutch sleeve 6.

The driven shaft 1 rotates in the direction D1 at the rotating speed n1. When the driven shaft 3 is driven to rotate in the same direction D1 at the rotating speed n2 that is higher than the rotating speed n1, a state S5 of FIG. 5E is established. The same state is established when the driving shaft 1

In the above state, the arm portion 5a of the clutch spring is caught by the notch edge 6c of the clutch sleeve 6, while the other arm portion 5a is freed. This causes the spring-fitted portion 4a of the driven sleeve 4 to move in the direction D1 relative to the arm portion 5b of the clutch spring 5. The clutch spring 5 loosens and slips relative to the spring-fitted portions 4a. Consequently, the driven shaft 3 is rotated in the same direction D1 at the rotating speed n2 that is higher than the speed at which the driving shaft 1 is rotated. Thus, the clutch unit operates as an overrunning clutch such that the driving shaft 1 and driven shaft 3 are disengaged.

When the driving shaft 1 is rotated in the direction D2, clockwise, the driving sleeve 2 is rotated in the direction D2 defining state S6 of FIG. 5F. The arm portions 5a and 5b of the clutch spring 5 are temporarily freed.

In a state S7 of FIG. 5G, the arm portion 5a of the clutch spring 5 is abuts the notch edge 2b of the driven sleeve 2. In a state S8 of FIG. 5H, the arm portion 5b of the clutch spring 5 abuts the notch edge 6d of the clutch sleeve 6. In this state, the clutch spring 5 engages the spring-fitted portion 4a of the driven sleeve 4. In a state S9 of FIG. 5I, the driven shaft 3 can be driven to rotate in the direction D2. When the driven shaft is driven in the direction D2, the driven shaft 3 can be driven to rotate with higher torque than when it is driven in the direction D1, as in the states S4 and S5.

As mentioned above, for transmitting the rotation in the direction D2 of the driving shaft 1 in the state S8, the arm portion 5a of the clutch spring 5 may be driven by the notch edge 2b of the driving sleeve 2. The arm portion 5b need not always be abutting the notch edge 6d of the clutch sleeve 6.

Figure 6:
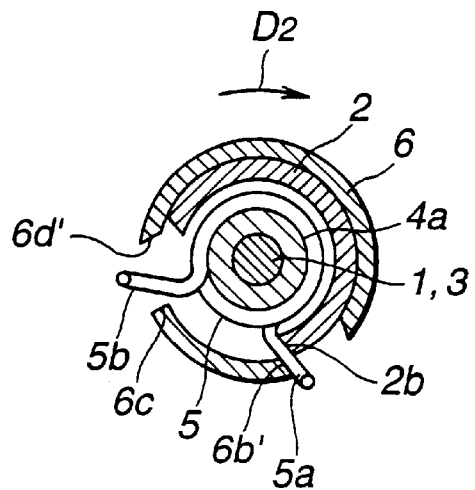
FIG. 6 is an orthogonal cross sectional view of a clutch unit in accordance with a variant of the first embodiment, wherein a drive force produces reverse rotation.

The orthogonal cross sectional view of FIG. 6 shows a clutch unit in accordance with a variant of the foregoing embodiment. In FIG. 6, the clutch unit is driven to rotate reversely. Specifically, a notch edge 6d' of the clutch sleeve 6 is disengaged from the ann portion 5a of the clutch spring 5. The arm portion 5b of the clutch spring 5 is sandwiched between the notch edge 2b of the driving sleeve 2 and a notch edge 6b' of the clutch sleeve 6. This enables driving the clutch unit in the direction D2.

Furthermore, when the clutch unit is driven to produce rotation in the direction D1 (normal direction), the clutch unit assumes the state S5 shown in FIG. 5E. Thus, the clutch unit can be driven to produce rotation in both directions. Moreover, since the clutch structure is symmetrical in both the directions, an overrunning clutch mechanism can be realized.

As mentioned above, in the clutch unit according to the first embodiment or variant thereof, torque exerted to rotate the driving shaft 1 in either direction can be transmitted to the driven shaft 3. The clutch unit can therefore be adapted to a driving system driving in both directions. The clutch unit can be applied to a wide range of driving systems. The clutch spring 5 having the aforementioned arm portions provides for transmitting rotational force in either direction. The unit can be constructed compactly. Moreover, switching between transmitting rotational force in one direction to another can be performed reliably. Furthermore, rotation in both the directions of the driving shaft 1 can be transmitted. Additionally, rotating speed of the driven shaft 3 may exceed that of the driving shaft 1.

Next, a description will be made of a camera in accordance with the second embodiment of the present invention.

Figure 7:
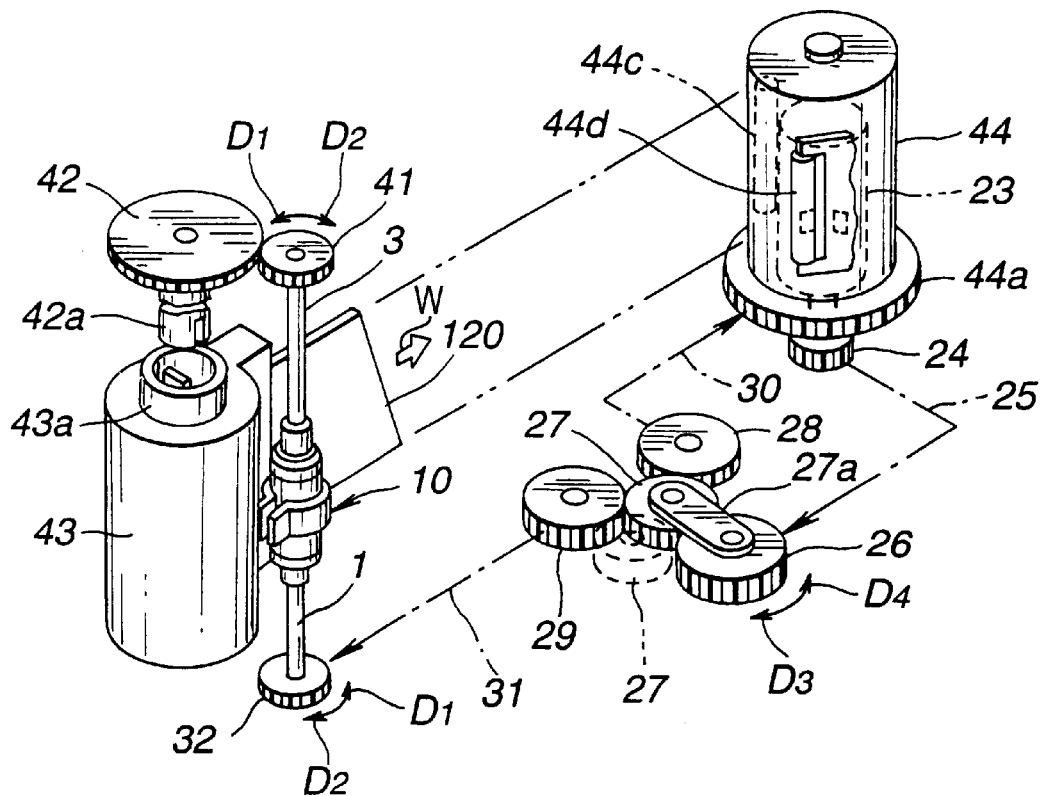
FIG. 7 is a perspective oblique view of a film feeding and driving system in a camera in accordance with the second embodiment of the present invention.

FIG. 7 is a perspective oblique view of the components of a film feeding and driving system in a camera. The camera includes a film cartridge 43 for advancing film. The clutch unit 10 in accordance with the first embodiment, an overrunning clutch that can be driven for normal and reverse rotations, is incorporated in the film feeding and driving system.

Driving force exerted from the drive motor is transmitted to a sun gear 26 via a pinion 24 and gear train 25. The sun gear 26 is included in the epicyclic gear 10 mechanism. An epicyclic gear 27 is pivoted by a pivotable arm 27a. The epicyclic gear 27 can mesh with both driven gears 28 and 29 or with the driven gear 29 alone. The driven gear 28 drives a spool shaft, while the driven gear 29 drives a cartridge shaft.

The driven gear 28 is coupled with a gear 44a of a spool shaft 44 via the spool gear train 30. A roller 44c is located near the spool shaft 44. Film can be wound about the spool shaft 44 by a roller 44d. The roller 44d is rotatably mounted on a blade spring. The driven gear 29 is coupled to a clutch driving gear 32 via a cartridge gear train 31.

The clutch driving gear 32 is fixed to the driving shaft 1 of the clutch unit 10 of the first embodiment. The clutch driving gear 32 drives the clutch unit 10 and ultimately a gear 41 fixed to the driven shaft 3. A driving system consisting of the foregoing components and including the clutch driving gear 32 shall be referred to as a first driving system.

The gear 41 meshes with a cartridge driving gear 42. The cartridge driving gear 42 has a fork portion 42a that is received in a cartridge shaft 43a of the film cartridge 43.

As mentioned below, after a film is advanced from the cartridge shaft 43a to the spool shaft 44, the film 120 must be maintained in tension. For this reason, a winding rate at which the film is wound about the spool shaft 44 is greater than an advancing rate at which the film is advanced from the cartridge shaft 43a.

Consequently, driving force exerted to rotate the spool shaft 44 drives the cartridge shaft 43a by way of the film 120. Torque producing rotation in the direction D1 is applied to the driven shaft 3 via the cartridge driving gear 42 and gear 41. A driving system consisting of the spool shaft 44, and the cartridge driving gear 42 and gear 41 linked to the spool shaft 44 by the film 120 shall be referred to as a second driving system. The second driving system induces torque, which rotates the driven shaft 3 in the direction D1.

In the film feeding and driving system having the foregoing components, for advancing the film 120, the sun gear 26 is, as shown in FIG. 7, driven to rotate in the direction D3 by the drive motor 23. The driven gear 28 and driven gear 29 are driven via the epicyclic gear 27. The driven gear 28 drives the spool shaft 44 in a winding direction W, in which the film is wound, via the gear train 30. The foregoing is premised on the film 120 not having been fed initially.

By contrast, the driven gear 29 drives the driving shaft 1 in the direction D1 at the rotating speed n1 via the gear train 31 and clutch driving gear 32. Under these conditions, the clutch unit 10 assumes the state shown in FIG. 4A or the state S4 in FIG. 5D. The driven shaft 3 is driven in the same direction at the same rotating speed.

With the rotation of the driven shaft 3, the cartridge shaft 43 is driven to rotate in an advancing direction in which the film is advanced. When the film 120 reaches a spool chamber 52 (FIG. 8), that is a film wind chamber, the film begins to be wound about the spool shaft 44. The winding rate is, as mentioned above, greater than the advancing rate at which the film is advanced from the cartridge shaft 43a. This is intended to prevent the film from slackening.

When the driving shaft 1 attempts to drive the driven shaft 3 via the first driving system, the driven shaft 3 is driven in the same direction D1 by the second driving system simultaneously. The driven shaft 3 is driven in the direction D1 at the rotating speed n2, which is greater than the rotating speed n1 at which the driving shaft 1 is driven to rotate. This causes the clutch unit 10 to assume the overrunning state, as shown in FIG. 4B or the state S5 in FIG. 5E. The film 120 is fed smoothly.

Winding film for photography is identical to winding film after the film is advanced.

For rewinding a film, as shown in FIG. 7, the driven motor 23 is driven to rotate reversely. The sun gear 27 is driven in a direction D4 to mesh independently with the driven gear 29 via the epicyclic gear mechanism. The driven gear 28 is freed. With the rotation of the driven gear 29, the clutch driving gear 32 is rotated in the direction D2, the direction of reverse rotation, via the gear train 31. The clutch unit 10 assumes the state shown in FIG. 4C or the state S8 shown in FIG. 5H. The driven shaft 3 is driven in the direction D2. With the rotation in the direction D2 of the driven shaft 3, the cartridge shaft 43a is driven to rotate in a rewinding direction in which the film is rewound.

Figure 8:
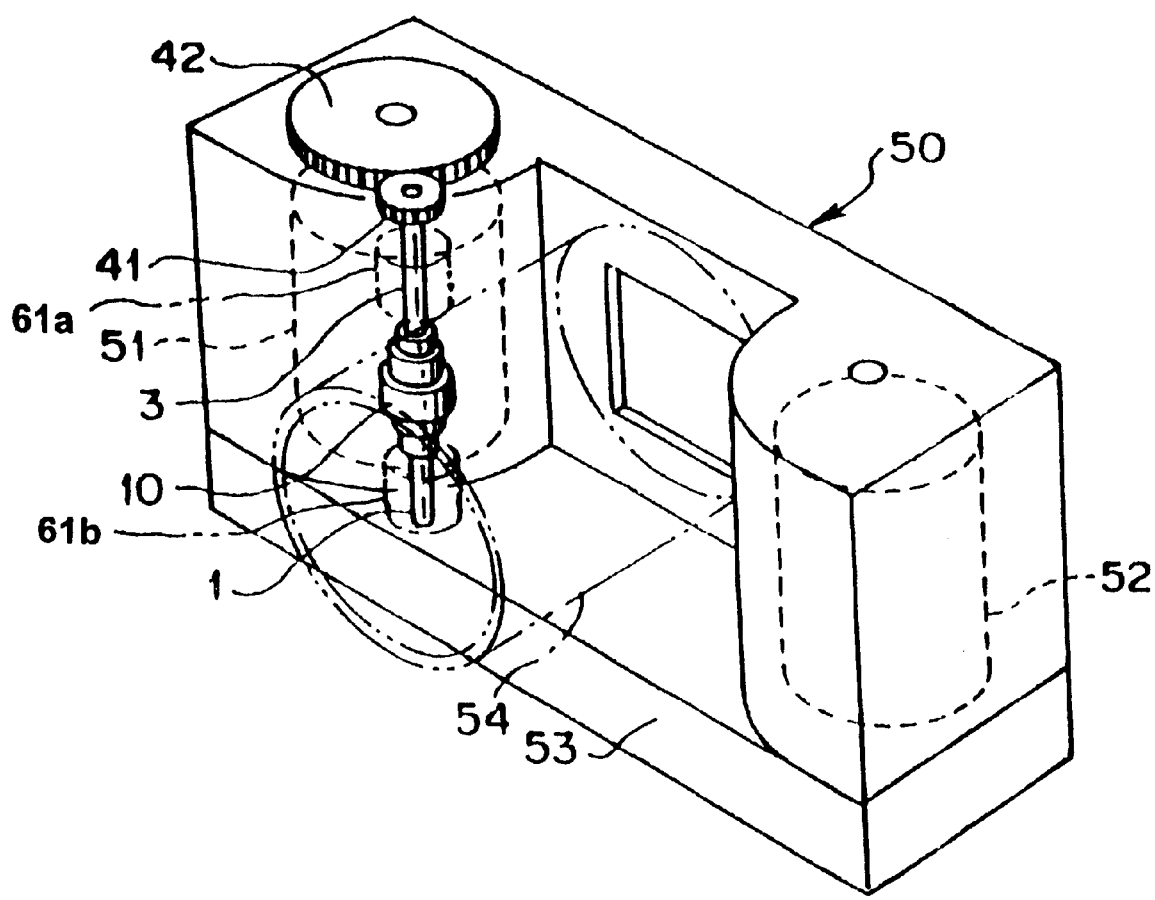
FIG. 8 is a perspective oblique view of a camera body of the camera in accordance with the second embodiment in which the components of the film feeding and driving system are arranged.
Figure 9:
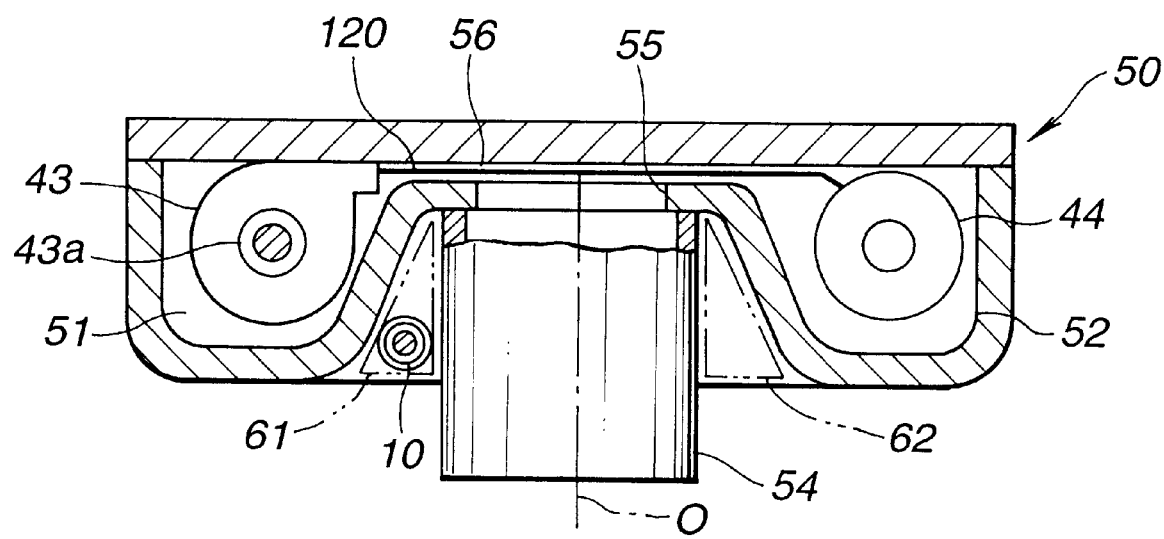
FIG. 9 is a transverse cross sectional view of the camera body and the arrangement of the components of the film feeding and driving system in the camera of the second embodiment, or in particular, the location of a clutch unit.
Figure 10:
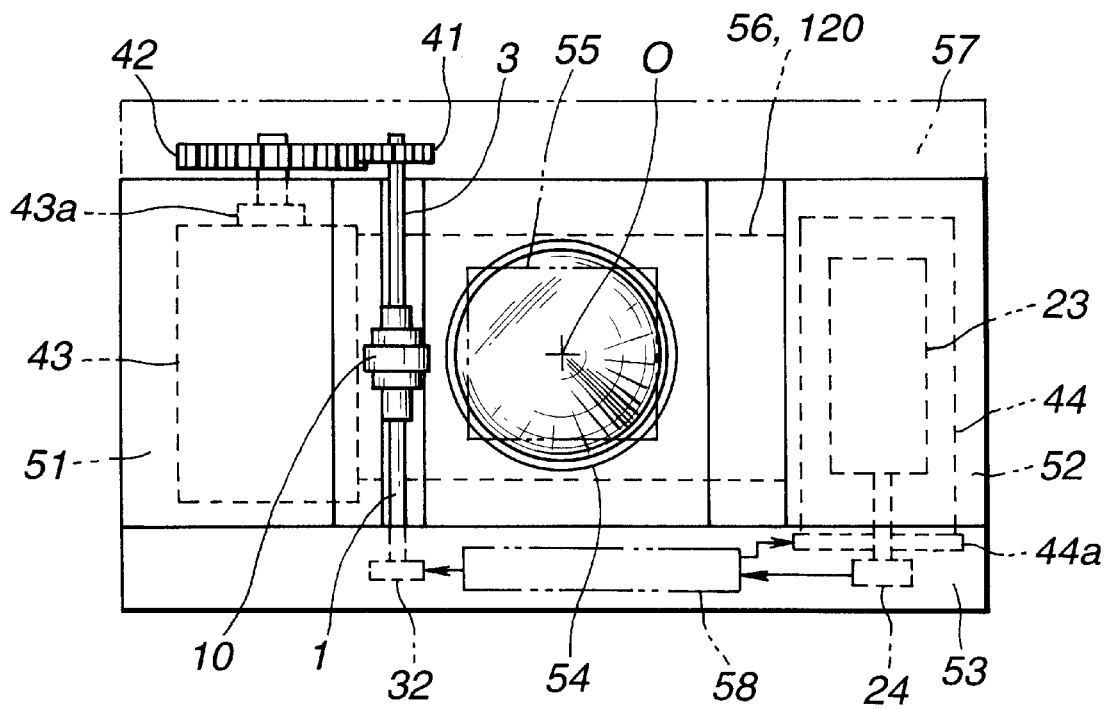
FIG. 10 is a front elevational view of the camera of the second embodiment and the arrangement of the components of the film feeding and driving system thereof.

Next, a description will be made of the location of the film feeding and driving system in a camera body. FIG. 8 and is a perspective oblique view and FIG. 9 is a transverse cross sectional view showing the film feeding and driving system, or more particularly, the locations of the clutch unit in a camera body 50. FIG. 10 is a front elevational view showing a film feeding and driving system incorporated in a camera body.

As shown in FIG. 9, the camera body 50 provides a film feeding path 56 between a cartridge chamber 51 and the spool chamber 52. An exposure screen mask 55 is located in the center of the film feeding path 56. A photographic lens barrel 54 defines an optical axis O substantially perpendicular to the screen mask 55.

The film cartridge 43 is loaded in the cartridge chamber 51 in the camera body 50. The spool shaft 44 is located in the spool chamber 52. The drive motor 23 is housed in the spool shaft 44.

A gear driving system 58 and the clutch driving gear 32 are located substantially on the same plane in a bottom space 53 of the camera body 50. The gear driving system 58 consists of the pinion 24 of the drive motor, the spool gear 44a, the gear trains 30 and 31, the sun gear 26, and the driven gears 28 and 29. The clutch driving gear 32 is fixed to the driving shaft 1 of the clutch unit 10.

The clutch unit 10 and the driving shaft 1 and driven shaft 3 thereof are housed in a space 61 created between the lens barrel 54 and one side of the cartridge chamber 51. The space 61 has a triangular shape in plan view. The driving shaft 1 and driven shaft 3 are coaxial and substantially parallel to the cartridge shaft. The gear 41 fixed to the driven shaft 3 and the cartridge driving gear 42 are located in an upper space 57 in the camera body.

According to the film feeding and driving system in the camera of the second embodiment, the clutch unit 10 of the first embodiment should be adapted to provide one driving system for driving the cartridge shaft. The driving system consists of the components beginning with the driving shaft 1, and can be positioned readily. By contrast, when the conventional one-way clutch mechanism is adapted, the cartridge shaft must be, as mentioned above, driven by both the driving gear and driven gear of the one-way clutch.

For driving the cartridge shaft, one driving system can be employed as mentioned above. The film feeding and driving system can therefore be positioned in the camera body as described below. Specifically, the gear trains for driving the spool and cartridge shafts, and the epicyclic gear mechanism are housed in the bottom space 53 of the camera body. The clutch unit 10 is located along the cartridge chamber. Thus, the film feeding and driving system can be positioned to drive the cartridge driving gear located in the upper part of the camera body. This promotes a compact or downsized camera.

One driving system can be, as mentioned above, employed in driving the cartridge shaft. The film feeding and driving system can therefore be positioned in the camera body as described below. The gear trains for driving the spool and cartridge shafts and the epicyclic gear mechanism can be housed on the same plane in the bottom space 53 of the camera body. The clutch unit 10 is located in the space 61 created between the lens barrel 54 and one side of the cartridge chamber 51. In other words, what had been dead spaces in the camera body now can be utilized effectively. Thus, the film feeding and driving system can be positioned to drive the cartridge driving gear located in the upper part of the camera body. This promotes a compact or downsized camera.

In the camera of the original embodiment, the clutch unit 10 included in the film feeding and driving system is located in the center of the space 61 between the lens barrel 54 and one side of the cartridge chamber 51. Alternatively, the clutch unit 10 may be located, as shown in FIG. 8, at an upper position 61a or lower position 61b in the space 61. Furthermore, the clutch unit 10 may be located in a space 62 shown in FIG. 9. The space created between the lens barrel 54 and one side of the spool chamber 52 is triangular in plan view.

Figure 11:
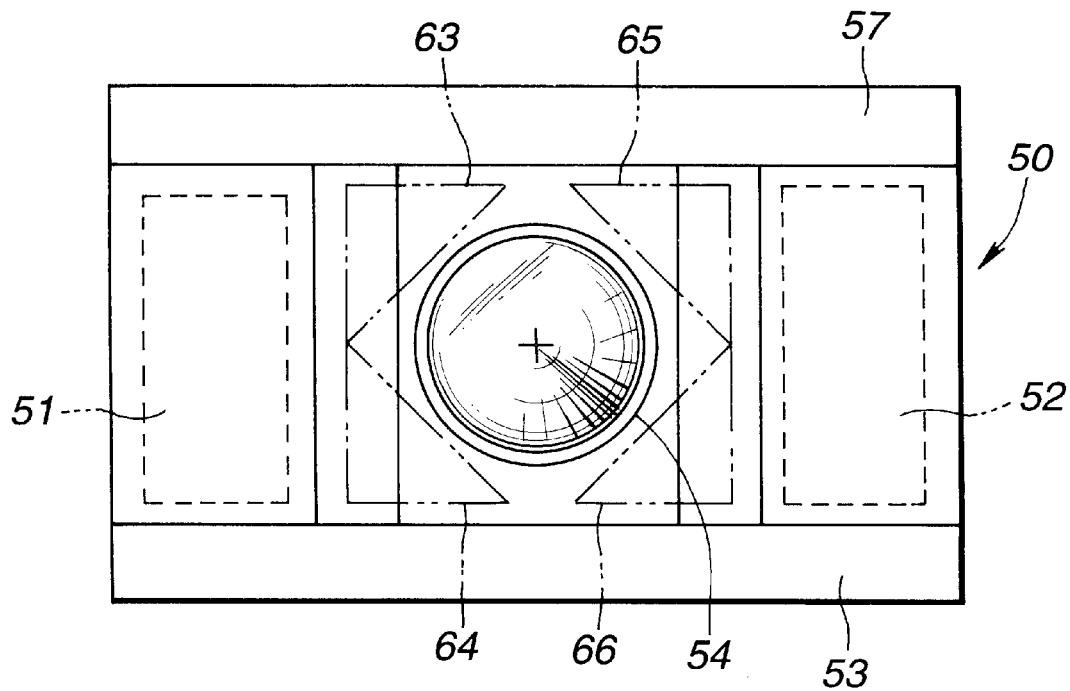
FIG. 11 is a front elevational view of the camera body and the arrangement of the components of the film feeding and driving system in the camera of the second embodiment excluding the clutch unit.

Furthermore, as shown in the front elevational view of FIG. 11 of the camera body, the clutch unit 10 may be located in any of spaces 63, 64, 65, and 66 that appear triangularly-shaped. The spaces are created between the lens barrel 54 and cartridge chamber 51 and between the lens barrel 54 and spool chamber 52.

Figure 12:
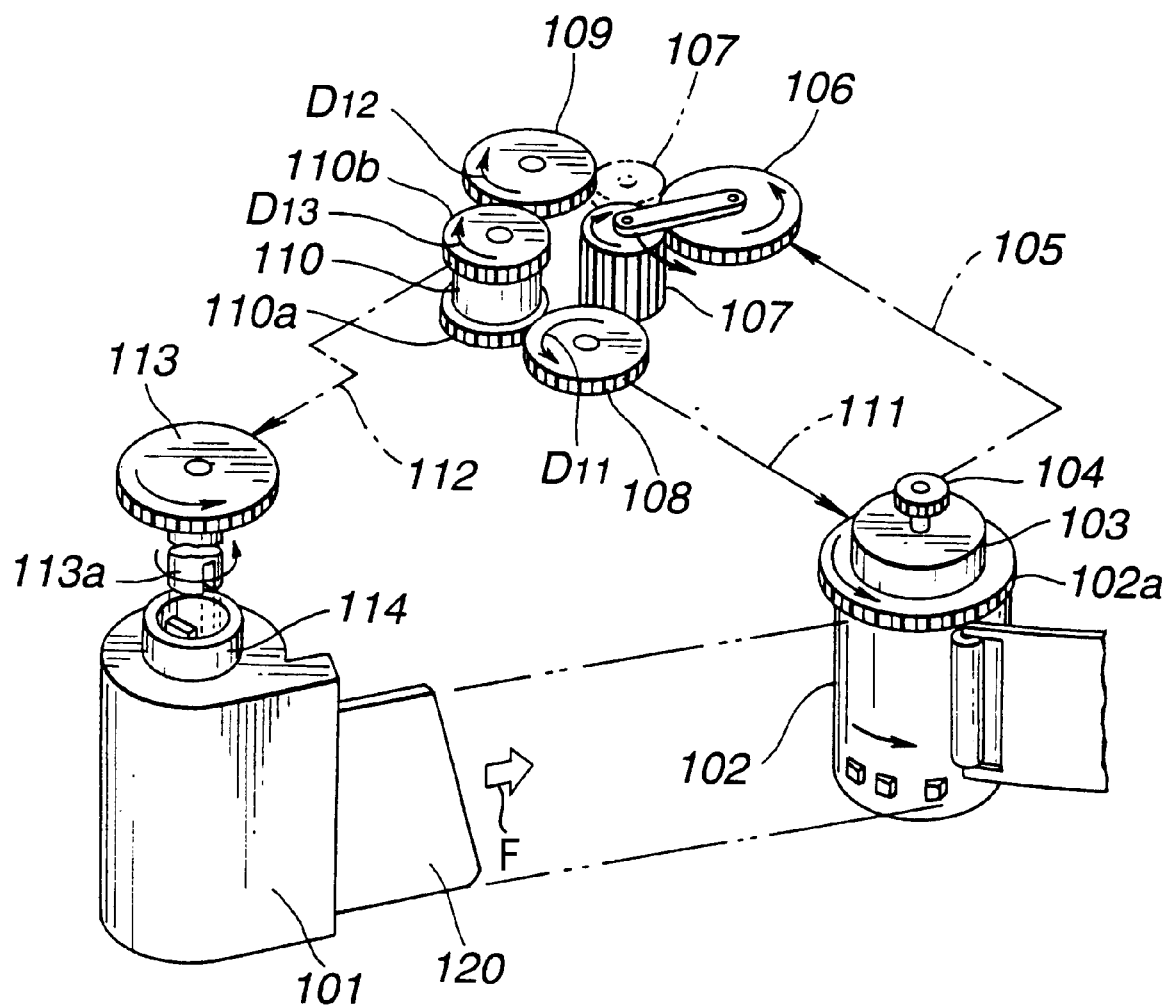
FIG. 12 is an oblique view of a driving system of a film feeding mechanism having a conventional one-way clutch unit incorporated therein.

In the camera of this embodiment, the clutch unit 10 included in a film feeding and driving system can serve as an overrunning clutch and can drive for producing reverse rotation. The present invention is not limited to the clutch unit 10. Alternatively, the conventional one-way clutch 110 described in conjunction with FIG. 12, that is, a one-way clutch unit that cannot transmit a reverse driving force will do. The one-way clutch 110 or any other clutch unit may be located in any of the spaces 61, 62, 63, 64, 65, and 66 created between the lens barrel 54 and cartridge chamber 51 and between the lens barrel 54 and spool chamber 52. This promotes a compact or downsized camera.

Furthermore, the gear trains for driving the spool and cartridge shafts and the epicyclic gear mechanism may all be located in the upper part of the camera body. Moreover, the cartridge driving gear may be located on the bottom of the camera body.

In the film feeding and driving system of the camera, the epicyclic gear mechanism is incorporated for switching the driven states of the driven gear 28 and those of the driven gear 29. The driven gear 28 drives the gear train 30 for driving the spool shaft, while the driven gear 29 drives the gear train 31 for driving the cartridge shaft. The epicyclic gear mechanism need not always be included. A film feeding and driving system in which the driven gears 28 and 29 are always driven to rotate may be employed. According to this variation, for rewinding a film, the drive motor 23 is driven to rotate reversely.

What is claimed is:

1. A clutch unit comprising:
a driving shaft that can be driven to rotate in both directions;
a driven shaft located coaxially relative to said driving shaft; and
a coil spring having arm portions capable of engaging with said driving shaft and a coil portion for frictionally engaging with said driven shaft for transmitting rotation of said driving shaft to said driven shaft,
wherein said coil spring rotates said driven shaft regardless of a direction said driving shaft is rotated;
whereby a driving force exerted for rotating said driving shaft in either direction can thus be transmitted to said driven shaft.

2. A clutch unit comprising:
a driving shaft that can be rotated in both directions;
a driven shaft located coaxially relative to said driving shaft; and
a coil spring having a coil portion for frictionally engaging with said driven shaft and arm portions extending from both ends thereof for abutting said driving shaft,
wherein when said driving shaft is rotated in one direction,
said driving shaft abuts one of said arm portions of said coil spring,
said coil portion of said coil spring drives said driven shaft,
friction between said driven shaft and an engaging part of said coil portion increases, and
rotation in one direction of said driving shaft is transmitted to said driven shaft so that said driven shaft can be rotated, and
wherein when said driving shaft is rotated in an opposite direction,
said driving shaft abuts the other arm portion of said coil spring,
said coil portion of said coil spring drives said driven shaft
friction between said driven shaft and said engaging part of said coil spring increases, and
rotation in the opposite direction of said driving shaft is transmitted to said driven shaft so that said driven shaft can be rotated.

3. A clutch unit comprising:
a driving shaft to be driven to rotate in both directions; and
a driven shaft located coaxially relative to said driving shaft operatively connected so that a driving force exerted for rotating said driving shaft is transmitted to said driven shaft,
wherein when a rotating speed at which said driven shaft is rotated in at least one direction exceeds a rotating speed at which said driving shaft is rotated, said driving shaft and driven shaft are disengaged from transmission of power.

4. A clutch unit comprising:
a driving shaft;
a driven shaft; and
a coil spring having a coil portion engaged with said driven shaft for transmitting rotation of said driving shaft,
wherein said coil spring drives said driven shaft, whether said driving shaft is rotated clockwise or counterclockwise.

5. A clutch unit according to claim 4, wherein said driven shaft is permitted to rotate at a greater speed than said driving shaft.

6. A clutch unit comprising:
a driving shaft;
a driven shaft; and
a coil spring having arm portions extending from both ends thereof and a coil portion engaging with said driven shaft for transmitting rotation of said driving shaft,
wherein, for transmitting rotation in one direction of said driving shaft to said driven shaft, said driving shaft abuts on one of said arm portions of said coil spring, and, for transmitting rotation in an opposite direction of said driving shaft to said driven shaft, said driving shaft abuts the other arm portion of said coil spring, and said coil spring drives said driven shaft.

7. A clutch unit according to claim 6, further comprising a transmission releasing means, wherein when rotation of said driven shaft is greater than rotation of said driving shaft, said transmission releasing means causes said coil spring to release said driven shaft.

8. A clutch unit comprising:
a driving shaft to be driven to rotate in both directions; and
a driven shaft located coaxially relative to said driving shaft operatively connected so that a driving force exerted for rotating said driving shaft is transmitted to said driven shaft,
wherein when rotation in at least one direction of said driven shaft is greater than rotation of said driving shaft, said driving shaft and driven shaft are disengaged from transmission of power.

9. A clutch unit comprising:
a driving shaft that can be rotated in both directions when influenced by a driving force exerted from a drive source;
a driven shaft located coaxially relative to said driving shaft; and
a coil spring having a coil portion for frictionally engaging with said driven shaft and arm portions extending from both ends thereof adapted to abut said driving shaft, coupling and uncoupling said driving shaft and driven shaft,
wherein when said driving shaft is rotated in one direction,
said driving shaft abuts one of said arm portions of said coil spring,
said coil portion of said coil spring drives said driven shaft,
friction between said driven shaft and an engaging part of said coil portion increases, and
rotation in one direction of said driving shaft is transmitted to said driven shaft so that said driven shaft can be rotated, and
wherein when said driving shaft is rotated in an opposite direction,
said driven shaft abuts the other arm portion of said coil spring,
said coil portion of said coil spring drives said driven shaft,
friction between said driven shaft and said engaging part of said coil portion increases, and
rotation in the opposite direction of said driving shaft is transmitted to said driven shaft so that said driven shaft can be rotated.

10. A clutch unit according to claim 9, further comprising a drive transmission system capable of driving and rotating said driven shaft without said driving shaft, wherein when a rotating speed at which said driven shaft is rotated by said drive transmission system is greater than a rotating speed at which said driving shaft is rotated, said driving shaft and driven shaft are disengaged from transmission of power.

11. A clutch unit according to claim 9, further comprising a drive transmission system capable of driving and rotating said driven shaft without said driving shaft, wherein when said driven shaft is driven by said drive transmission system, power of said driven shaft is not transmitted to said driving shaft.

12. A clutch unit according to claim 11, wherein when said driven shaft is driven to rotate by said drive transmission system, said driving shaft abuts one of said arm portions of said coil spring, said coil portion of said coil spring releases said driven shaft, and friction between said driven shaft and said engaging part of said coil portion is diminished so that rotation of said driven shaft will not be transmitted to said driving shaft.

13. A clutch unit according to claim 12, further comprising a clutch sleeve member that can be rotated to slide on said driving shaft and a friction application member for applying frictional force to said clutch sleeve member as it is rotated located coaxially relative to said driving shaft;
wherein when said driven shaft is rotated by said drive transmission system, said driving shaft abuts one of said arm portions of said coil spring and the other one of said arm portions of said coil spring abuts on said clutch sleeve member.

14. A camera including a film cartridge chamber in which a film cartridge having a cartridge shaft about which a film is wound is loaded, a film wind chamber having a film wind shaft about which a film advanced from said film cartridge is wound, and a photographic lens barrel that is interposed between said film cartridge chamber and film wind chamber and defines an optical axis substantially perpendicular to an exposure screen mask, comprising:
a clutch unit for transmitting a driving force exerted from a drive source to the cartridge shaft in the film cartridge so that a film will be advanced from the film cartridge, and, then when the advanced film reaches the film wind shaft in the film wind chamber and is then fed while being wound about said film wind shaft, not transmitting the driving force exerted from said drive source to said cartridge shaft, or vice versa;
said clutch unit being located between the film cartridge chamber and the photographic lens barrel or between the film wind chamber and the photographic lens barrel.

15. A camera having a photographic lens barrel that is interposed between a film cartridge chamber and a film wind chamber and defines an optical axis substantially perpendicular to an exposure screen mask, and a clutch unit that comprises:
a driving shaft that can be driven to rotate in both directions;
a driven shaft located coaxially relative to said driving shaft; and
a coil spring having arm portions capable of engaging with said driving shaft, and a coil portion for frictionally engaging with said driven shaft, said coil portion being adapted to drive said driven shaft in both directions, and being adapted to transmit a driving force, which is exerted for rotating said driving shaft in either direction, to said driven shaft;
wherein said clutch unit is located in a space created between the film cartridge chamber and the photographic lens barrel or between the film wind chamber and the photographic lens barrel.

16. A camera comprising a clutch mechanism for disconnecting power, with which a film is advanced from a film cartridge loaded in a film cartridge chamber, when the advanced film is wound about a film wind shaft in a film wind chamber,
wherein said clutch mechanism is located in a triangular space between the film cartridge chamber and a photographic lens barrel or between the film wind chamber and the photographic lens barrel.

17. A camera having a film cartridge chamber, a film wind chamber, a photographic lens barrel, and a clutch unit that comprises:
- a driving shaft;
- a driven shaft; and
- a coil spring to be engaged with said driven shaft for transmitting rotation of said driving shaft,
- wherein said coil spring drives said driven shaft whether said driving shaft is rotated clockwise or counterclockwise by tightening on said driven shaft to thereby transmit a driving force from said driving shaft to said driven shaft; and
- wherein said clutch unit is located in a space created between the photographic lens barrel and the film cartridge chamber or between the photographic lens barrel and the film wind chamber.

18. A camera according to claim 17, wherein said space in which said clutch unit is located appears triangular from the front or top of said camera.

19. A camera according to claim 17, wherein said clutch unit permits said driven shaft to rotate faster than said driving shaft.

20. A camera having a film cartridge chamber, a photographic lens barrel, and a clutch unit that comprises:
- a driving shaft;
- a driven shaft; and
- a coil spring having arm portions extending from both ends thereof and a coil portion engaging with said driven shaft, and thus transmitting rotation of said driving shaft, and
- wherein, for transmitting rotation in one direction of said driving shaft to said driven shaft, said driving shaft of said clutch unit abuts one of said arm portions of said coil spring and, for transmitting rotation in an opposite direction of said driving shaft to said driven shaft, said driving shaft abuts the other arm portion of said coil spring, said coil spring driving said driven shaft;
- said clutch unit being located in a space created between the photographic lens barrel and the film cartridge chamber or between the photographic lens barrel and the film wind chamber.

21. A camera according to claim 20, wherein said clutch unit further comprises a transmission releasing means, wherein, when rotation of said driven shaft is greater than rotation of said driving shaft, said transmission releasing means causes said coil spring to release said driven shaft.

22. A camera according to claim 21, wherein said space in which said clutch unit is located is between the photographic lens barrel and the film cartridge chamber or the film wind chamber, and appears triangular from the front or top of said camera.

23. A camera according to claim 21, wherein said space in which said clutch unit is located is enclosed with the photographic lens barrel, a housing, and the film cartridge chamber or with the photographic lens barrel, the housing, and the film wind chamber.

24. A camera, having a photographic lens barrel that is located on a film feeding path linking a film cartridge chamber and a film wind chamber and defines an optical axis substantially perpendicular to an exposure screen mask, comprising:
- a driving shaft that can be driven to rotate in both directions;
- a driven shaft located coaxially relative to said driving shaft operatively connected so that a driving force exerted for rotating said driving shaft is transmitted to said driven shaft;
- a first driving system for driving and rotating said driven shaft;
- a second driving system for driving and rotating said driven shaft without said driving shaft; and
- a clutch unit, interposed between said driving shaft and driven shaft, for, when power exerted for rotating said driving shaft in one of both directions via said first driving system is transmitted to said driven shaft, if a rotating speed at which said driven shaft is rotated in said one direction by said second driving system is greater than a rotating speed at which said driving shaft is rotated, disengaging said driving shaft and said driven shaft from transmission of power,
- wherein said clutch unit is located in a space between the film cartridge chamber and the photographic lens barrel or between the film wind chamber and the photographic lens barrel.

25. A camera, having a photographic lens barrel that is located on a film feeding path linking a film cartridge chamber and a film wind chamber and defines an optical axis substantially perpendicular to an exposure screen mask and a clutch unit that comprises:
- a driving shaft that can be rotated in both directions when influenced by a driving force exerted from a drive source;
- a driven shaft located coaxially relative to said driving shaft; and
- a coil spring enabling coupling and uncoupling of said driving shaft and said driven shaft, and having a coil portion for frictionally engaging with said driven shaft and arm portions extending from both ends thereof so that the arm portions can abut said driving shaft,
- wherein when said driving shaft is rotated in one direction,
  - said driving shaft abuts one of said arm portions of said coil spring,
  - said coil portion of said coil spring drives said driven shaft,
  - friction between said driven shaft and an engaging part of said coil portion is increased, and rotation in one direction of said driving shaft is transmitted to said driven shaft so that said driven shaft can be rotated; and
- when said driving shaft is rotated in an opposite direction,
  - said driven shaft abuts the other arm portion of said coil spring, said coil portion of said coil spring drives said driven shaft,
  - friction between said driven shaft and said engaging part of said coil portion is increased, and
  - rotation in the opposite direction of said driving shaft is transmitted to said driven shaft so that said driven shaft can be rotated, and
- wherein said clutch is located in a space created between the film cartridge chamber and the photographic lens barrel or between the film wind chamber and the photographic lens barrel.

26. A camera according to claim 25, wherein said clutch unit further comprises a drive transmission system capable of driving and rotating said driven shaft without said driving shaft; and, when a rotating speed at which said driven shaft is rotated by said drive transmission system exceeds a rotating speed at which said driving shaft is driven, said driving shaft and driven shaft are disengaged from transmission of power.

27. A camera according to claim 25, wherein said clutch unit further comprises a drive transmission system capable of driving and rotating said driven shaft without said driving shaft; and when said driven shaft is driven by said drive system transmission system, power of said driven shaft is not transmitted to said driving shaft.

28. A camera according to claim 27, wherein, when said driven shaft of said clutch unit is rotated by said drive transmission system, said driving shaft thereof abuts one of said arm portions of said coil spring, said coil portion of said coil spring is loosened from said driven shaft, and friction between said driven shaft and said engaging part of said coil portion is diminished so that rotation of said driven shaft is not be transmitted to said driving shaft.

29. A camera according to claim 28, wherein a clutch sleeve member, which can be rotated to slide on said driving shaft, and a friction application member for applying frictional force to said clutch sleeve member being rotated are located coaxially relative to said driving shaft in said clutch unit; and, when said driven shaft is rotated by said drive transmission system, said driving shaft abuts one of said arm portions of said coil spring, and one of said arm portions of said coil spring abuts said clutch sleeve member.

* * * * *